July 16, 1963 R. B. ASHLEY 3,098,171
TRANSISTOR VERTICAL DEFLECTION CIRCUIT
Filed July 5, 1960
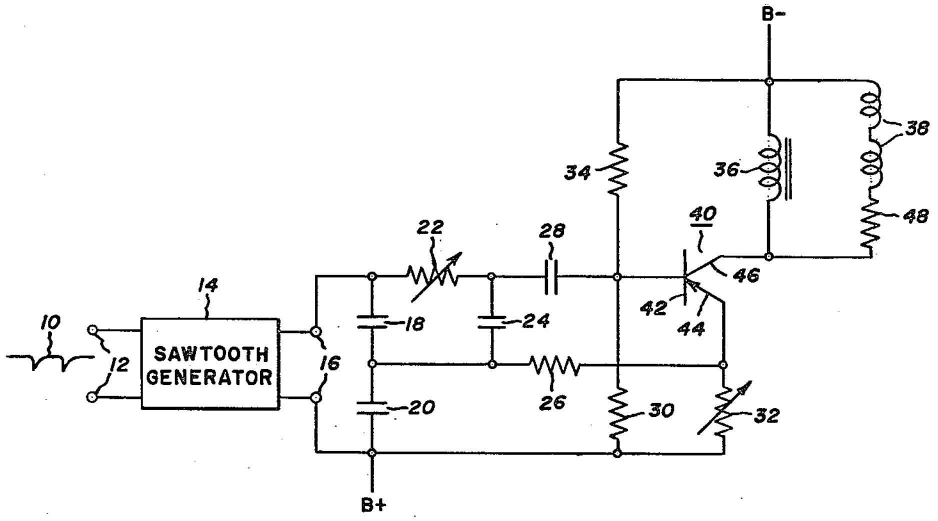
INVENTOR:
ROBERT B. ASHLEY,
BY Joseph Levinson
HIS ATTORNEY.

United States Patent Office 3,098,171

Patented July 16, 1963

3,098,171
TRANSISTOR VERTICAL DEFLECTION CIRCUIT

Robert B. Ashley, North Syracuse, N.Y., assignor to General Electric Company, a corporation of New York Filed July 5, 1960, Ser. No. 40,947
5 Claims. (Cl. 315—27)

This invention relates to a vertical deflection circuit for a television receiver and more particularly to such a circuit utilizing transistors and having means therein to correct for vertical non-linearities associated with such transistor devices.

In vertical deflecting systems, a sawtooth current (which rises linearly during the scanning period) is applied to the vertical yoke deflection coils. Accordingly, during the scanning period the electron beam is deflected from the top of the raster to the bottom. The current then changes quickly from plus to minus at which time the electron beam is deflected from the bottom to the top of the raster. This process is repetitive. For proper scanning, it is generally essential that the current rise linearly during the scanning period. The required sawtooth current is generally provided by a sawtooth generator and amplified by a vertical output stage and applied to the vertical deflection coils.

A transistor amplifier might advantageously be used with electromagnetic deflection for providing the sawtooth current required by the yoke because a transistor with good current handling characteristics requires lower supply voltages. Furthermore, conventional deflection yokes would be capable of being driven by a transistor amplifier without the use of transformers. However, a major problem exists with respect to vertical linearity. This is caused by the transistor which has a reduced current amplification factor (beta) at high current levels. As the sawtooth current is applied to the transistor the current gain of the transistor decreases with an increase in the applied current. Therefore to obtain a linear sawtooth current from the output transistor, something other than a sawtooth current must be applied at the input of the transistor to compensate for the drop-off in current amplification.

It is an object of this invention to provide an improved transistor vertical deflection circuit which corrects the vertical non-linearities normally encountered with a transistor vertical output stage.

A further object of this invention is to provide an improved transistor vertical deflection circuit which pre-distorts the input to a transistor vertical output stage to compensate for changes in the current amplification factor of the transistor and to improve thereby the linearity of the vertical deflection system.

In carrying out this invention in one illustrative embodiment thereof, a coupling network is inserted between the vertical sawtooth generator and the vertical output stage of the deflection system which corrects for the vertical non-linearities inherent in such transistorized deflection systems. The coupling network includes an integrating circuit and a feedback path including a second integrating network which pre-distorts the input to the vertical output stage such that a current applied thereto has a slope which increases in magnitude with time.

These and other advantages of this invention will be more clearly understood from the following description taken in connection with the accompanying drawing, and its scope will be apparent from the appended claims.

The drawing is a schematic diagram of the improved vertical deflection circuit embodied in this invention.

Referring now to the drawing, a wave 10 of repetitive negative synchronizing pulses is applied to a pair of input terminals 12 of a sawtooth generator 14. The wave 10 provides synchronization between the incoming signal and the operation of the vertical deflection system. The sawtooth generator 14 may be a multivibrator type or a blocking oscillator type which are believed well known to those skilled in the art. The only requirement for sawtooth generator 14 is that a sawtooth waveform be provided at its output represented by a pair of output terminals 16.

The sawtooth output from the sawtooth generator 14 is applied across a capacitor 18 and a capacitor 20 which are serially connected across the output terminals 16 of the generator 14. An integrating network comprising a variable resistor 22 and a capacitor 24 are connected across the capacitor 18. The output of the integrating network is coupled from the junction of variable resistor 22 and capacitor 24 by a coupling capacitor 28 to a base electrode 42 of a PNP transistor 40. A transistor 40 has a collector electrode 46 and an emitter electrode 44 and is connected in a common emitter configuration which offers high current gain. Biasing is provided for the transistor 40 by a resistor 34 connected between the base electrode 42 and a source of B minus potential, a resistor 30 connected between the base 42 and a source of B plus potential and a resistor 32 connected between the emitter electrode 44 and a source of B plus potential. For a PNP type transistor such as transistor 40, the emitter-base junction is biased in a forward direction and the collector-base junction is biased in a reverse direction. A choke 36 is connected between the collector electrode 46 and the source of B minus potential. A pair of vertical deflection coils which are represented by coils 38 having a resistance represented by a resistor 48 are connected to the output of transistor 40 between the collector electrode 46 and the source of B minus potential. The choke 36 has a relatively high inductance and a low resistance compared to the yoke coils 38 for removing the direct current component from the yoke coils 38. A resistor 26 is connected between the emitter electrode 44 and the junction of capacitors 18, 20 and 24.

As has previously been stated, a sawtooth current is desired to be applied to the deflection coils 38. If such a current is applied to the base electrode 42 of transistor 40, the collector current will drop-off due to the reduced current amplification factor at higher current levels. This drop-off in collector current produces non-linearity in vertical scanning. Accordingly, a linear sawtooth function cannot be applied to the base electrode 42 but it must be pre-distorted such that the collector current of the transistor 40 does increase linearly with time. This function is accomplished by the present invention.

In operation, the sawtooth voltage from the sawtooth generator 14 is divided across the capacitors 18 and 20. The voltage across capacitor 18 is integrated by the integrating network comprising variable resistor 22 and the capacitor 24 to produce a parabolic waveform across the capacitor 24. The voltage then applied between the base and emitter electrodes 42 and 44 respectively of the transistor 40 is the sum of the sawtooth voltage appearing across capacitor 20 and the parabolic voltage appearing across capacitor 24 which provides a voltage that increases exponentially with time. To provide further linearity control, a feedback voltage is taken across the resistor 32 and applied by resistor 26 to the junction of the capacitors 18, 20 and 24. This signal is integrated across capacitor 20 and resistor 26. The sum of the voltages across capacitor 24 and resistor 26 is coupled to the base 42 of transistor 40 by the capacitor 28. The integration provided by the circuit of resistor 22 and capacitor 24 and the integrated feedback voltage provided by resistor 26 and capacitor 20 increase the quality of the output of the transistor 40 to provide greater linearity control and allow a range of transistors to be used which previously were unacceptable.

Since the transistor 40 has a low impedance, the coupling network between the sawtooth generator and the transistor must also have a low output impedance for maximum efficiency. With the use of the feedback signal, the integrating action of the entire network is increased and smaller values of capacitors may be employed to provide the necessary impedance match. Normally larger capacitors would be required to provide a low output impedance for the network necessary to drive the output transistor.

Although a range of circuit parameters are available for the circuit embodied in this invention depending on its particular environment, one operative illustrative embodiment contained parameters as follows:

| | |
|---|---|
| Capacitor **18** | 100 microfarads. |
| Capacitor **20** | 190 microfarads. |
| Resistor **22** | 100 ohms. |
| Capacitor **24** | 190 microfarads. |
| Resistor **26** | 12 ohms. |
| Capacitor **28** | 750 microfarads. |
| Resistor **30** | 180 ohms. |
| Resistor **32** | 2 ohms. |
| Resistor **34** | 5300 ohms. |
| Choke **36** | 630 millihenries, 14 ohms. |
| Coils **38** | 85 millihenries. |
| Transistor **40** | 2N 1138A. |
| Resistor **48** | 85 ohms. |
| B minus | 10 volts. |

It will be appreciated by those skilled in the art that an NPN transistor might be utilized in place of PNP transistor 40 if the polarities of the waveforms and potentials applied to the circuit are reversed.

Since other modifications and changes varied to fit particular operating requirements will be apparent to those skilled in the art, the invention is not considered limited to the examples chosen for purposes of disclosure and covers all modifications which do not constitute departures from the true spirit and scope of this invention.

What I claim as new and desire to secure by Letters Patent of the United States is:

1. A vertical deflection circuit comprising in combination: electrical signal generator means having a pair of output terminals thereof and providing therebetween a signal having a sawtooth waveform; a first capacitor and a second capacitor serially connected between said output terminals; a first integrating network coupled in parallel with said first capacitor; a transistor having base, emitter and collector electrodes; means for coupling said first integrating network to said base electrode; an output load circuit for said transistor including a vertical deflection coil coupled to said collector electrode; impedance means coupled to said emitter electrode for providing feedback for said transistor; and a resistive impedance coupled between said emitter electrode and a junction of said first and second capacitors, said resistive impedance and said second capacitor forming a second integrating network.

2. A vertical deflection circuit having a pair of input terminals; means for applying a sawtooth waveform to said input terminals; a first capacitor and a second capacitor connected in series between said input terminals; first resistive impedance means and a third capacitor connected in parallel with said first capacitor; a transistor having base, emitter and collector electrode; means for coupling a junction of said first resistive impedance means and said third capacitor to the base electrode of said transistor; an output load circuit for said transistor including a vertical deflection coil coupled to said collector electrode; a second resistive impedance means coupled to said emitter electrode for conducting emitter electrode current; and a third resistive impedance means coupled between said emitter electrode and a junction of said first, second and third capacitors.

3. A vertical deflection circuit comprising in combination: electrical signal generator means having a pair of output terminals thereof and providing therebetween a signal having a sawtooth waveform; a first capacitor and a second capacitor serially connected between said output terminals; a first integrating network connected in parallel with said first capacitor; a transistor having base, emitter and collector electrodes; means for coupling said first integrating network to said base electrode; an output load circuit for said transistor including a vertical deflection coil coupled to said collector electrode; a first resistor connected to said emitter electrode for conducting emitter electrode current and providing a voltage proportional thereto at said emitter electrode; and a second resistor connected between said emitter electrode and the junction of said first and second capacitors for providing a feedback path for part of the feedback voltage developed at the emitter electrode, said second resistor and said second capacitor adapted for integrating said feedback voltage.

4. A vertical deflection circuit comprising in combination: electrical signal generator means having a pair of output terminals thereof and providing therebetween a signal having a sawtooth voltage waveform; a first capacitor and a second capacitor serially connected between said output terminals; a first integrating network comprising a serially connected first resistor and a third capacitor connected in parallel with said first capacitor for integrating said sawtooth voltage waveform to provide a parabolic voltage waveform; a transistor having base, emitter and collector electrodes; means for coupling said integrating network to said base electrode; an output load circuit for said transistor including a vertical deflection coil coupled to said collector electrode; a second resistor connected between said emitter electrode; a third resistor connected between said emitter electrode and the junction of said first and second capacitors to provide a feedback path for a sawtooth voltage occurring at said emitter electrode, said third resistor and said second capacitor forming on integrating network for integrating the sawtooth voltage at said emitter electrode; and means for applying the said latter integrated voltage to said base electrode.

5. A vertical deflection circuit comprising in combination: electrical signal generator means having a pair of output terminals thereof and providing therebetween a signal having a sawtooth waveform; a first capacitor and a second capacitor serially connected between said output terminals; a first integrating network coupled in parallel with said first capacitor; a transistor having base emitter and collector electrodes; means coupling said first integrating network to said base electrode; a vertical deflection coil coupled to said collector electrode; first impedance means coupled to an electrode of said transistor for conducting deflection coil current and providing a voltage proportional thereto; resistive impedance means coupled between said first impedance means and a junction of said first and second capacitances, said resistive impedance means and said second capacitor adapted for integrating said voltage which is proportional to the coil current.

References Cited in the file of this patent

UNITED STATES PATENTS

| | | |
|---|---|---|
| 2,859,379 | Ellis | Nov. 4, 1958 |
| 2,874,329 | Janssen et al. | Feb. 17, 1959 |
| 2,886,740 | Finkelstein | May 12, 1959 |

OTHER REFERENCES

Palmer et al.: IRE Transactions on Broadcast and Television Receivers, October 1957; title, "Transistorized TV Vertical Deflection System," pages 103–104.